Dec. 10, 1946.  C. E. TACK  2,412,432
BRAKE ROTOR
Filed April 26, 1945  2 Sheets-Sheet 1
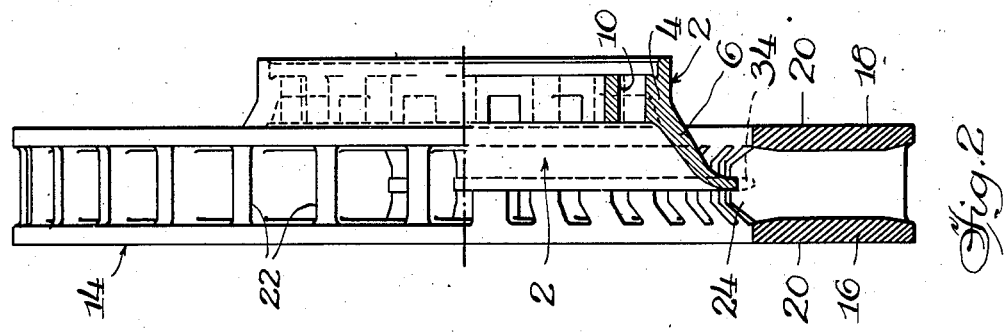
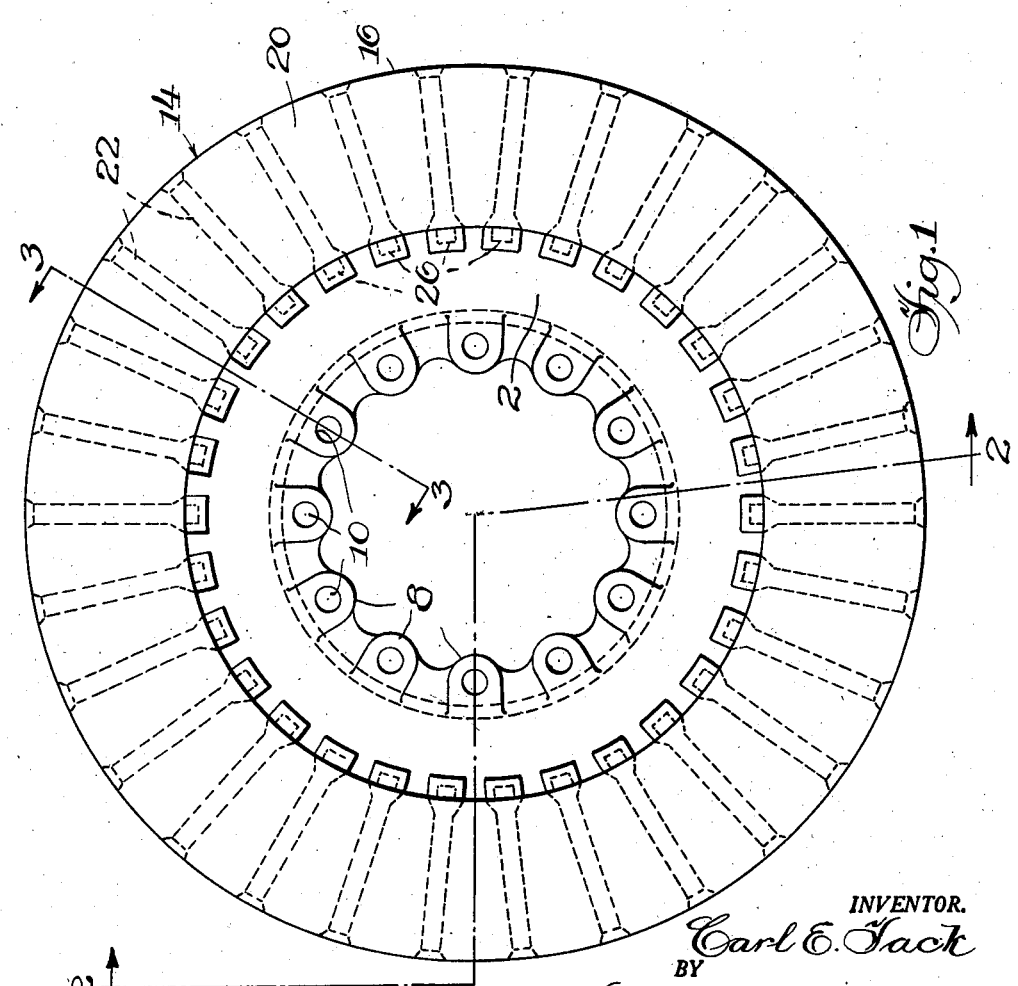
INVENTOR.
Carl E. Tack
BY Dec. 10, 1946.  C. E. TACK  2,412,432
BRAKE ROTOR
Filed April 26, 1945  2 Sheets-Sheet 2
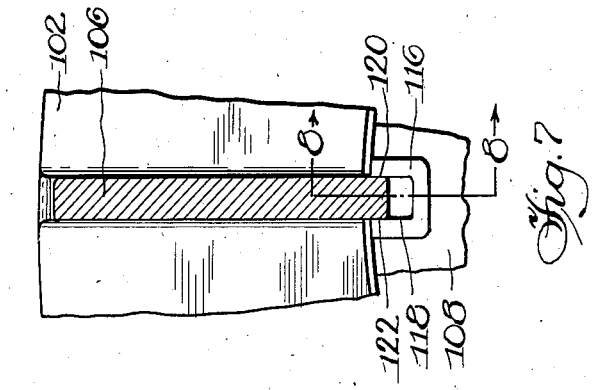
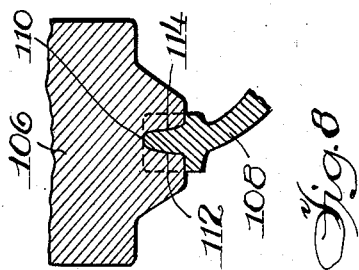
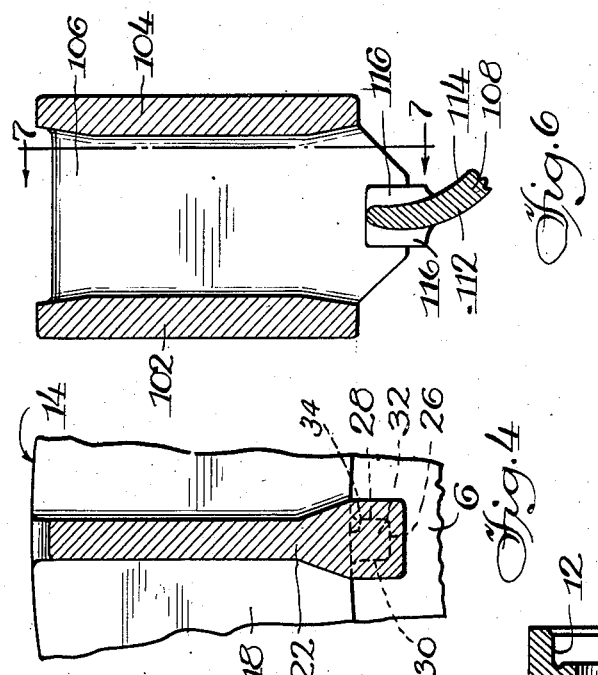
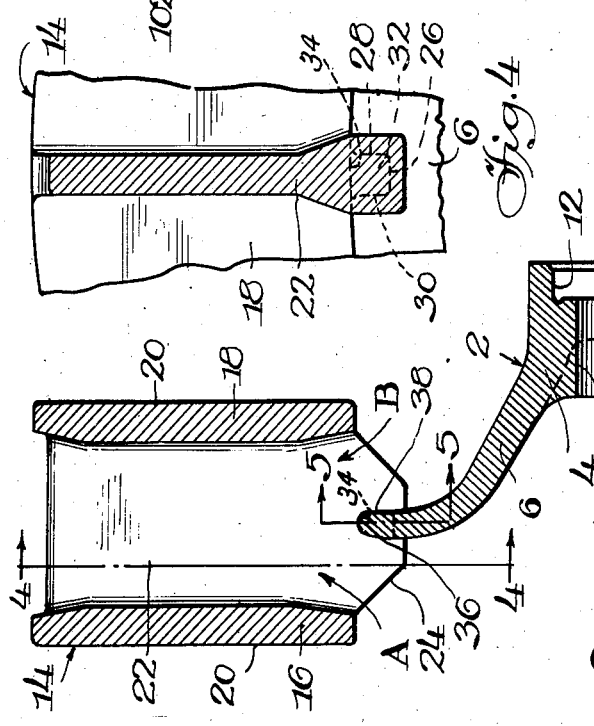
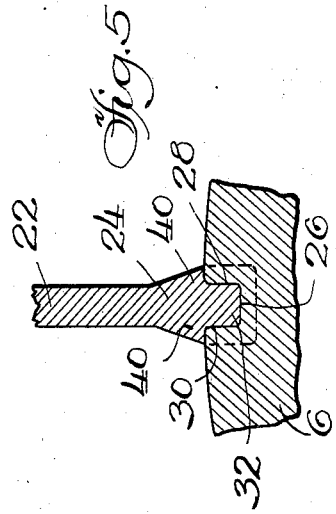
INVENTOR.
Carl E. Tack,
BY
Orin O. B. Garner
Atty.

Patented Dec. 10, 1946

2,412,432

UNITED STATES PATENT OFFICE 2,412,432

BRAKE ROTOR

Carl E. Tack, Chicago, Ill., assignor to American Steel Foundries, Chicago, Ill., a corporation of New Jersey Application April 26, 1945, Serial No. 590,393

15 Claims. (Cl. 188—218)

My invention relates to brake equipment and particularly to a novel form of rotor designed to be associated with other braking means commonly called stators whose engagement with said rotor is commonly utilized as a means of stopping a wheel or other rotating member.

My novel rotor is particularly adapted for use with railway rolling stock, although it will be understood that such a rotor may be utilized for any equivalent purpose for which it may be readily adapted.

Brake rotors of the double inlet blower type are generally preferred in the art over rotors of the single inlet blower type. While both types of rotors are usually supported by a disclike support member for the strength and rigidity afforded thereby, in the latter type of rotor, the support member is connected at its inner circumference to the wheel or member to be braked and has its outer circumference formed integral with or imbedded in one of the friction plates of the rotor, whereby a static air space is had between the said friction plate and the support member. As a consequence, a portion of the tremendous heat energy in the friction plate induced by the braking operation is absorbed by the static air which then fails to effect the necessary rapid absorption of the heat from the plate to prevent radial expansion of the latter with the result that undesirable thermal stresses occur in the friction plate which may cause radial cracking of the plate itself and breakage of the plate and also associated portions of the rotor.

In the double inlet blower type, the support member is secured to the blades or vanes between the friction plates in a two-plate rotor and to the central plate in a three-plate rotor, whereby a continuous flow of air is had from the space between the wheel and the adjacent friction plate of the rotor by the air being drawn from the space by the blades into the rotor, effecting a flow of cooler air into the space with the result that the heat is conducted from the plate and dissipated to an extent insuring a lesser radial expansion of the plate and diminished thermal stresses in the rotor.

Another disadvantage of the single inlet blower type is that a laminated film of air tends to remain present on the inner surfaces of the friction plates of the rotor which serves to insulate said surfaces and to prevent cooling thereof by the air passing through the rotor, whereas in the rotor of the double inlet blower type, a turbulent flow of air is had through the rotor from the air flowing in on both sides of the support member which prevents the film of air from insulating the said surfaces and thereby effecting greater cooling of the friction plates.

While rotors of the double inlet blower type are thus more satisfactory than the single inlet type, in the first-mentioned type of rotors certain disadvantages exist in their use in railway rolling stock. An important disadvantage arises in the failure to provide for the radial expansion of the rotor brake ring relative to its supporting member due to the tremendous heat energy induced in the brake ring during a braking operation and the consequent differential in temperature of the same and the support member whereby the support member tends to remain in a static condition while the brake ring tends to expand radially of the support. This result is attributable to the fact that the rotor may be formed entirely of iron or steel whereby the heated brake ring will tend to expand radially outward of the relatively static cooler support member, or that, in a two-piece rotor, the support member is usually formed of a metal, such as steel, having a higher tensile strength and different coefficient of expansion than the metal of the brake ring which is almost invariably cast iron for its superior friction qualities. Thus, brake rotors of the type having the brake ring integral with the support member or connected thereto by imbedding the support in the brake ring by utilizing elements of keystone or tapered form integral with one member in complementary interlocking engagement with the other member, prevent the radial expansion and contraction of the brake ring and the resultant undesirable thermal stresses in the rotor often cause cracking of the plates and the associated portions of the rotor.

Various attempts have been made in the art to provide a brake rotor of the last-mentioned type which would satisfactorily accommodate radial expansion and contraction of the plates relative to the support member without setting up undesirable thermal stresses. It has been attempted in one instance to remedy this problem in the art by providing an annular support member formed of flexible sheet metal having a bent or corrugated annular portion concentric with and extending around the support member between its connections to the wheel and brake ring whereby upon radial expansion and contraction of the friction plates, the corrugated portion of the support will expand or contract radially concurrently with the plates to prevent stresses in the rotor. This design of rotor is impractical for the repeated expansion and contraction of the corrugated portion of the support soon causes fatigue in the metal forming the same and resultant cracking of the support along this portion. Also, formation of the support member of a flexible metal is disadvantageous as axial movement of the member may be readily had by the failure of concurrent application of the stators to the friction plates which causes distortion of the support member and also induces fatigue in the corrugated portion by the constant bending thereof. A support member having these characteristics can not be formed rigid enough for service and still have the required flexibility for radial expansion and contraction.

It is an object of my invention to provide a novel rotor of the double inlet blower type comprising a brake ring and a rigid support therefor connected in such manner that radial expansion and contraction of the brake ring is freely accommodated by the support member while circumferential and axial movement of the brake ring relative to the support member is prevented.

Another object of my invention is to provide a rotor of the type described wherein the connection between the brake ring and the support is in the form of a mechanical expansion joint for the purposes above described.

A still further object of my invention is to provide a rotor of the type described wherein the support member is connected to the blades of the brake ring in such manner that relative movement between the ring and member is afforded in a radial direction and prevented in circumferential and axial directions.

My invention contemplates a design of rotor comprising a brake ring having a pair of friction plates connected together and formed integral with a plurality of blades extending therebetween, and wherein one embodiment of my invention a rigid annular support member is formed with radial notches in the outer perimeter thereof slidably receiving portions of the blades therein and the blades extend downwardly along the opposite sides of the support in slidable engagement therewith whereby radial movement of the brake ring relative to the support member is accommodated and relative axial and circumferential movement of the brake ring and support member is prevented.

In the other embodiment of my invention the brake ring is connected to the support member by forming each of the blades of the brake ring with a transverse slot in its inner edge slidably receiving the outer perimeter of the support member, and wherein the adjacent portions of the member on the opposite sides of each blade extend outwardly along the blade and slidably engage the same for obtaining the above described desirable results.

In the drawings:

Figure 1 is a side elevation of one embodiment of my novel form of rotor.

Figure 2 is an edge view taken from the left as seen in Figure 1 with a portion of the rotor cut away along the radial planes indicated by the line 2—2 of Figure 1.

Figure 3 is an enlarged sectional view taken in the radial planes indicated by the line 3—3 of Figure 1.

Figure 4 is an enlarged sectional view taken in the plane indicated by the line 4—4 of Figure 3.

Figure 5 is an enlarged sectional view taken in the plane indicated by the line 5—5 of Figure 3.

Figure 6 is a fragmentary sectional view of another embodiment of my invention, the section being taken through the rotor in a plane similar to that of Figure 4.

Figure 7 is a sectional view taken in the plane indicated by the line 7—7 of Figure 6, and Figure 8 is an enlarged sectional view taken in the plane indicated by the line 8—8 of Figure 7.

Describing my novel rotor shown in Figures 1-6 inclusive in detail, the rotor comprises a rotor support generally designated 2, said rotor support being a rigid steel member of disc-like form including a hub portion 4 integrally formed with a bell-like member 6, the shape of which is best indicated in Figures 2 and 3. The hub portion 4 of the support member 2 comprises a plurality of spaced bosses 8, 8 and a plurality of openings 10, 10 extending therethrough and through said bosses. It will be readily apparent to those skilled in the art that the bore 12 in the hub portion 4 may be fitted over a complementary portion on an associated rotating member and may be secured thereto by any convenient means such as bolts (not shown) extending through the openings 10, 10, said hub portion 4 being reinforced at its points of connection to said rotating member by the bosses 8, 8. It may be noted from a consideration of Figures 2 and 3 that the shape of the bell-like member 6 and the substantial thickness of the same affords a support member of substantial strength and rigidity for resisting movement in an axial direction relative to the wheel during the braking operation.

The brake ring, designated as a whole by reference character 14, is of the double inlet blower type and formed preferably of cast iron and is cast about the outer circumference of the bell-like member 6 of the support member 2 and connected thereto in a novel manner hereinafter described. The brake ring is an integral casting comprising two spaced friction plates 16 and 18, each of annular form and arranged in parallel planes, and each having a friction surface 20 for engagement in usual manner with stators (not shown). Integrally joining the friction plates 16 and 18 are a series of radially extending and equally spaced blades 22 each having a relatively thick portion 24, wedge shaped in side elevation and in cross section, forming its inner edge and projecting radially inwardly of the friction plates 16 and 18 and connected intermediate the lateral ends thereof to the member 6 of the support 2, as clearly seen in Figures 3, 4 and 5. It may be noted that the arrangement described provides a rotor wherein the air inlets from the inboard and outboard sides of the rotor are illustrated by the curved arrows A and B (Figure 3), whereby, during the braking operation, cooling air is drawn into the rotor from opposite sides of the support member by the blades and turbulently flows through the rotor, thereby effecting dissipation of a portion of the heat energy in the friction plates induced by their engagement with the stators (not shown).

While rotors of the double inlet blower type, as well as rotors of the single inlet blower type, effect a certain amount of cooling of the friction plates of the rotor by circulation of cooling air through the rotor and about the friction faces of the plates, a substantial portion of the heat energy in the friction plates, resulting from the braking operation, is retained in the plates and connecting blades causing radial expansion of the plates relative to the support member as the latter member can not absorb sufficient heat rapidly enough from the friction plates to expand uniformly and concurrently with the plates.

Rotors of practical design necessarily utilize a rigid support member, usually formed of a metal having a high tensile strength, such as steel, to insure adequate strength and toughness, and the brake ring is usually formed of cast iron, noted as being among the best materials for providing friction or braking surfaces but having a coefficient of expansion different than steel. Rotors of the double inlet blower type in the art utilizing a rigid steel support member and a cast iron brake ring have usually been formed with the brake ring having the support member integrally joined thereto or connected thereto by keystone or tapered means preventing relative radial movement between the brake ring and support member, whereby the wide differential in temperatures of the brake ring and support member, causes the brake ring to expand substantially faster than the support member in a radially outward direction inducing undesirable stresses in the plates which may crack the same and other portions of the rotor, impairing the braking ability of the plates and causing possible breakage of the rotor.

My invention resides in solving this problem in the art by connecting the rigid support member 2 and the brake ring 14 in such manner that in service the brake ring may expand radially outwardly of the support member during the braking operation, while relative axial and circumferential movement of the brake ring and support member is prevented at all times. To this end and referring now to Figures 2 to 5 inclusive, the brake ring is cast about the outer perimeter of the bell-like member 6 of the support 4, the latter portion of the member 6 having been previously formed with a plurality of equally spaced notches 26 radially arranged and extending transversely through the outer circumferential edge thereof, each notch being formed with substantially parallel plane faces 28 and 30 for slidably engaging a projection 32 formed in a slot 34 extending transversely of the portion 24 of the blade intermediate the ends thereof, as clearly shown in Figures 2, 4 and 5, the inboard and outboard sides of the member 6 adjacent the outer perimetrical edge thereof slidably engaging the sides 36 and 38 defining the slot 34 in the blade. To permit relative movement between the brake ring and the support member in a radial direction, the metal forming the brake ring may be cast upon the support member when the latter is cool so that fusing of the ring and the support member is prevented.

It will be apparent that the structural features of this connection of the brake ring and support member will permit the expansion of the brake ring radially outward of the support member, during the braking operation, by the slidable engagement of the projections of the blades with the faces 28 and 30 defining the notches in the bell-like member 6 and the similar engagement of the inboard and outboard sides of said member 6 with the sides 36 and 38 defining the slots 34 in the blades. Circumferential movement of the brake ring relative to the support member is prevented by the engagement of the projections 32 in the slots 34 of the blades with the faces 28 and 30 in the notches in the member 6. Axial movement of the brake ring relative to the support member is also prevented by the engagement of the inboard and outboard sides of the member 6 with the sides 36 and 38 defining the slots 34 in the blades.

It may be noted from a consideration of Figures 3 and 5 that the blade portions 40 on each side of the projection in the slot in each blade engage the circumferential outer face of the bell-like member 6 and also that the thickened portion 24 of each blade extends outwardly of the inboard and outward sides of the member 6, whereby the connection of the blade to the support member is substantially strengthened and resistant to relative movement between the brake ring and support member except movement of the brake ring radially outward of the support member during the braking operation.

In the embodiment of the invention shown in Figures 6 and 7, the support member and brake ring are formed substantially identical as those previously described, the brake ring comprising the spaced annular friction plates 102 and 104 connected by a plurality of radial blades 106 extending therebetween. Each blade 106 is formed with the inner extremity thereof extending radially inwardly of the friction plates and having a substantially uniform thickness throughout its length. In the present embodiment of the invention the outer perimeter of the rigid support member 108 is received within a notch 110 formed in the inner extremity of each blade and extending transversely therethrough, the inboard and outboard sides 112 and 114 of the outer perimetrical edge of said member slidably engaging the surfaces defining opposite sides of the notch in each blade. The outer perimeter of the support member is formed at its juncture with each blade with U-shaped bosses 116, 116 on opposite sides thereof having aligned slots 118, 118 in the plane of said blade receiving the blade and having the sides 120 and 122 defining the slot 118 in each boss in slidable engagement with the opposite sides of the blade. It will be apparent that expansion of the brake ring in the direction radially outward of the support member will be freely accommodated by the slidable engagement of the blades of the brake ring with the support member and that relative axial movement of the brake ring and support member is prevented by the engagement of the surfaces defining the opposite sides of the notch 110 in each blade with the inboard and outboard sides 112 and 114 of the support member. It will be clearly apparent that relative circumferential movement of the brake ring and support member is prevented by the engagement of each blade with the sides 120 and 122 defining the slot 118 in each boss 116 of the support member.

It may be noted that in both embodiments of my invention the connection of the support member and brake ring blades forms a mechanical expansion joint therebetween for accomplishing the novel results set forth in the objects of my invention and which thereby prevents thermal stresses in the rotor during the braking operation which may crack the friction plates with attendant possible fracture of the blades or the support member and consequent breakage of the rotor.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a combination brake rotor and blower structure, a rigid bell-like support member having wheel-connecting means at its inner perimeter, a brake ring cast about the outer perimeter of said member and comprising a pair of annular friction plates and a plurality of spaced radially arranged blades extending between said plates and transversely of said member, each of said blades having a relatively thickened portion at its radially inner extremity projecting outwardly of said plates, and means connecting the outer perimeter of said member and said blade portions, said means comprising a slot in each blade portion extending transversely thereof and slidably receiving therewithin the outer perimeter of said member, each of said slots having a projection therein slidably received within a notch in the outer perimeter of said member extending transversely through said member, said means being formed and arranged to permit radial expansion and contraction of said brake ring relative to said support member and to prevent relative axial and circumferential movement of said brake ring and said support member.

2. In a combination brake rotor and blower structure, a rigid bell-like support member having wheel-connecting means at its inner perimeter, an integral brake ring cast about the outer perimeter of said member and comprising a pair of annular friction plates and a plurality of spaced radially arranged blades extending between said plates and extending transversely of said member, each of said blades having its radially inner extremity projecting outwardly of said plates, and means connecting the outer perimeter of said member and the radially inner extremities of said blades, said means comprising a slot in each of said blade extremities extending transversely thereof and slidably receiving therewithin the outer perimeter of said member, each of said slots having a projection therein slidably received within a notch in the outer perimeter of said member extending transversely through said member, said means being formed and arranged to permit radial expansion and contraction of said brake ring relative to said support member and to prevent relative axial and circumferential movement of said brake ring in said support member.

3. In a combination brake rotor and blower structure, an annular rigid support member having a hub for concentric connection to a supporting wheel, a brake ring cast about the outer perimeter of said member and comprising a pair of spaced annular friction plates and a plurality of spaced radially arranged blades extending between said plates and transversely of said member, and means connecting said blades to the outer perimeter of said member, said means comprising a slot in each of said blades extending transversely thereof and slidably receiving therewithin the outer perimeter of said member, each of said slots having a projection therein slidably received within a notch in the outer perimeter of said member extending transversely through said member, said means being formed and arranged to permit radial expansion and contraction of said brake ring relative to said support member and to prevent relative axial and circumferential movement of said brake ring and said support member.

4. In a combination brake rotor and blower structure, a rigid bell-like support member having wheel-connecting means at the inner perimeter thereof and a plurality of spaced radially disposed bosses arranged on the outer perimeter of said member and extending outwardly on opposite sides of said member, an annular rotor blower element surrounding said member and comprising a pair of spaced friction plates and spaced radially arranged blades integrally formed with said plates, and means connecting said blades and said member, said means comprising a slot in each of said blades extending transversely therethrough slidably receiving the outer perimeter of said member, and each of said bosses having an opening therein slidably receiving spaced portions of the adjacent blade at opposite sides of said slot, to permit radial movement of said element in a radially outward direction of said member and to prevent relative circumferential and axial movement of said member and element.

5. In a combination brake rotor and blower structure, a rigid bell-like support member having wheel-connecting means at the inner perimeter thereof and a plurality of radially arranged bosses extending outwardly at opposite sides of the outer perimeter thereof, a rotor blower element comprising a pair of friction plates and spaced radially arranged blades integrally formed with said plates and having the radially inner extremities thereof extending outwardly of said plates, and means connecting the radially inner extremities of said blades and the outer perimeter of said member, said means comprising a slot extending transversely through each of said blades and slidably receiving the outer perimeter of said member, and each of said bosses having an opening extending in the plane of the associated blade for slidably receiving the same, whereby radial expansion and contraction of said element relative to said member is accommodated and relative axial and circumferential movement of said member and element is prevented.

6. In a combination brake rotor and blower structure, a rigid bell-like support member having at its smaller diameter end wheel-connecting means and at its large diameter end a serrate perimeter, a rotor blower element cast on said support member, said element comprising a pair of annular friction plates and spaced radially disposed blades integrally formed with said plates and extending therebetween, and means connecting said blades at their radially inner extremities to said serrate perimeter, said means comprising a slot in each blade extending transversely thereof and slidably receiving the opposite sides of said member therebetween, and projections in said slots slidably received within the openings in said serrate perimeter, said means being formed and arranged to permit radial expansion and contraction of said element relative to said support member and to prevent relative axial and circumferential movement of said element and said member.

7. In a combination brake rotor and blower structure, a rigid annular support member having wheel-connecting means at its inner perimeter, a rotor blower element cast on the outer perimeter of said support member, said element comprising a pair of annular friction plates and spaced radially disposed blades integrally formed with said plates and extending therebetween, each of said blades extending transversely of said member, and means connecting said blades and the outer perimeter of said member, said means comprising a slot in each blade extending transversely therethrough and slidably receiving the outer perimeter of said member and interengaging means on said blade comprising a protuberance within the said slot and slidably engaging a complementary notch in the outer perimeter of said member, whereby said element is relatively slidable radially of said member, said connecting means permitting radial expansion and contraction of said element relative to said member and preventing relative axial and circumferential movement of said element and said member.

8. In a combination brake rotor and blower structure, a rigid bell-like support member having wheel-connecting means at the inner perimeter thereof and a plurality of radially arranged bosses extending outwardly at opposite sides of the outer perimeter thereof, a rotor blower element comprising a pair of friction plates and spaced radially arranged blades integrally formed with said plates, and means connecting said blades and said support member, said means comprising a slot in each blade slidably receiving the outer perimeter of said member, and an opening in each of the associated bosses extending in the plane of said blade for slidably engaging opposite sides of said blade whereby radial expansion and contraction of said element relative to said member is accommodated and relative circumferential and axial movement of said member and element is prevented.

9. In a combination brake rotor and blower structure, a rigid annular support member having a hub arranged for concentric connection to a supporting rotating member, a rotor blower element cast on the outer perimeter of said member, said element comprising a pair of friction plates and spaced radially arranged blades extending therebetween and integrally formed therewith, and means connecting said blades and said member, said means comprising a slot in each blade extending transversely therethrough and slidably receiving said support member, and means disposed on opposite sides of said member and at opposite sides of each blade and having slidable engagement therewith in the plane of said blade, said connecting means permitting movement of said element radially outward of said member and preventing relative circumferential and axial movement of said member and element.

10. In a combination brake rotor and blower structure, a rigid annular support member having a hub arranged for concentric connection to a supporting rotating member, a rotor blower element cast on the outer perimeter of said member, said element comprising a pair of friction plates and spaced radially arranged blades extending therebetween and integrally formed therewith, and means connecting said blades and said member, said means comprising slots extending through the radially inner extremities of said blades transversely thereof and slidably receiving opposite sides of said member, and means disposed on opposite sides of said member and slidably engaging opposite sides of each blade, said connecting means permitting movement of said element radially outward of said member and preventing relative circumferential and axial movement of said member and element.

11. In a combination brake rotor and blower structure, a rigid bell-like support member having wheel-connecting means at its inner perimeter, a rotor blower element cast on the outer perimeter of said member, said element comprising a pair of annular friction plates and spaced radially disposed blades integrally formed with said plates and extending transversely of said member, and a plurality of aligned slots in said blades radially disposed about the outer perimeter of said member and receiving the same for slidably interconnecting said blades and members, and means in each of said slots slidably engaging spaced notches in the outer perimeter of said member, whereby movement of said element relative to said member in a radially outward direction is accommodated and relative axial and circumferential movement of said element and said member is prevented.

12. In a combination brake rotor and blower structure, a rigid bell-like support member having wheel-connecting means at its inner perimeter, a rotor blower element cast on the outer perimeter of said member, said element comprising a pair of annular friction plates and spaced radially disposed blades integrally formed with said plates and extending transversely of said member, and tongue and groove means connecting the radially inner extremity of each blade and the outer perimeter of the support member, said means being formed and arranged to permit expansion and contraction of said element radially of said member and to prevent relative circumferential movement of said element and member, and means on said blades engaging the inboard and outboard sides of said element to prevent relative axial movement of said element and member.

13. In a combination brake rotor and blower structure, a rigid annular support member having a hub arranged for concentric connection to a supporting rotating member, a rotor blower element cast on the outer perimeter of said member, said element comprising a pair of friction plates and spaced radially arranged blades extending therebetween and integrally formed therewith, each of said blades extending transversely of said member and having a slot in the plane of said member for slidably receiving the same, and said member having means on opposite sides thereof extending along the adjacent sides of each blade for slidably engaging the same, to permit expansion and contraction of said element radially of said member and to prevent relative axial and circumferential movement of said member and element.

14. In a combination brake rotor and blower structure, a rigid annular support member, a rotor blower element cast on the outer perimeter of said member, said element comprising spaced friction plates and blades extending therebetween and secured thereto, each of said blades extending transversely of said member and having means slidably engaging the opposite sides of said member and the outer perimeter of said member and interlocked with said sides and perimeter, whereby radial expansion and contraction of said element relative to said support member is accommodated and relative axial and circumferential movement of said element and member is prevented.

15. In a combination brake rotor and blower structure, a rigid annular support member, a rotor blower element surrounding said member and comprising a plurality of spaced annular friction plates and spaced radially arranged blade members extending between said plates, and interengaging means on each blade member and the outer perimeter of said support member, said means comprising slots extending transversely through each of said members and slidably engaging opposite sides of the other of said members to permit expansion and contraction of said element radially of said member and to prevent relative axial and circumferential movement of said member and element.

CARL E. TACK.